(12) United States Patent
Yen et al.

(10) Patent No.: US 8,658,704 B2
(45) Date of Patent: Feb. 25, 2014

(54) CHI (χ)-ALUMINA DISPERSION AND APPLICATION TO COATING SLURRY OF DIGITAL PRINTING MEDIUM

(75) Inventors: Fu-Su Yen, Tainan (TW); Tzung-Jiung Wu, Taichung (TW)

(73) Assignee: National Cheng Kung University, Tainan (TW)

( * ) Notice: Subject to any disclaimer, the term of this patent is extended or adjusted under 35 U.S.C. 154(b) by 192 days.

(21) Appl. No.: 13/372,513

(22) Filed: Feb. 14, 2012

(65) Prior Publication Data
US 2012/0141781 A1 Jun. 7, 2012

Related U.S. Application Data

(62) Division of application No. 12/416,943, filed on Apr. 2, 2009, now Pat. No. 8,138,230.

(30) Foreign Application Priority Data

Oct. 22, 2008 (TW) ................................ 97140542 A

(51) Int. Cl.
*B05D 5/00* (2006.01)
*B05D 3/10* (2006.01)
*B32B 29/00* (2006.01)

(52) U.S. Cl.
USPC ........................ 516/93; 427/372.2; 428/329

(58) Field of Classification Search
USPC ........................ 516/93; 427/372.2; 428/329
See application file for complete search history.

(56) References Cited

U.S. PATENT DOCUMENTS

2003/0007051 A1 * 1/2003 Takahashi et al. ............ 347/100

* cited by examiner

*Primary Examiner* — Ling Choi
*Assistant Examiner* — Chun-Cheng Wang
(74) *Attorney, Agent, or Firm* — CKC & Partners Co., Ltd.

(57) ABSTRACT

A chi (χ)-alumina dispersion and coating slurry of digital printing medium containing the same is disclosed, which includes flaked porous χ-alumina nanoparticles with high specific surface area but without gamma (γ)-alumina obtained by subjecting gibbsite to thermal treating, physical wet-milling and pH adjusting processes. Since the χ-alumina nanoparticles without dyes and pigments have high ink absorptivity and low cost, they can be applied to the coating layer of the digital printing medium instead of conventional silica material.

10 Claims, 10 Drawing Sheets

CHI (χ)-ALUMINA DISPERSION AND APPLICATION TO COATING SLURRY OF DIGITAL PRINTING MEDIUM

RELATED APPLICATIONS

This is a divisional application of U.S. patent application Ser. No. 12/416,943, filed Apr. 2, 2009, which is herein incorporated by reference and which claims the benefit of Taiwan Application No. 97140542, filed Oct. 22, 2008.

FIELD OF THE INVENTION

This invention relates generally to a coating slurry, and more particularly, to a coating slurry of digital printing medium, which contains flaked chi (χ)-alumina nanoparticles with high specific surface area, so as to form a coating layer with high ink absorptivity, water resistance, glossy or mat surface.

BACKGROUND OF THE INVENTION

Depending on speedy advancement of computer technology, computerized graphics (or digital printing) is the mainstream of modern printing technology. In comparison with complicated processes of conventional printing, digital printing is the reproduction of digital images on a surface of a print substrate (ex. paper) by in-position printing the selected ink pigments injected from lasers or specific nozzles that are controlled by delicate electrical injecting system. Hence, the printout of digital printing (ex. photo) is obtained and has printing quality and dots per inch (dpi) equally as conventional printing quality.

As such for ink jet printing technology, in addition to ink jet printing technology, the digital printing quality of ink jet printing is also improved by the composite printing material. It is important to produce the composite printing material that treats pigments and carriers appropriately during quickly injecting inks. That is to say, the composite printing material can separate pigments and carriers quickly. Moreover, the composite printing material can keep the pigments fixed at the selected location. Furthermore, the composite printing material can match the requirements of quick printing, water resistance, and necessarily glossy or mat gloss. In general, such composite printing material is composed of a printing substrate and a coating layer disposed thereon, for example, laminated paper. It is closely related among the cost, improved printing quality and imaging performance of the composite printing material, and the printing quality and imaging performance mainly depend on the coating layer. Typically, the coating layer includes powder and adhesive in a certain thickness, in which the powder serves to fill up uneven surface of the original printing substrate for smoothing. Various thickness of the coating layer can possess the surface of the composite printing material with glossy or mat gloss. Besides, the coating layer can provide opacity and improved whiteness, and it servers as mainly water and ink absorption capacity.

The powder commonly utilized in the composite printing material may be silica (silicon dioxide), clay, kaolin, calcium carbonate and so on. The powder preferably has the properties of uniformly particle size distribution, high whiteness, high gloss, low cost and good chemical stability as far as possible. The adhesive serves to improve the physical strength, surface performance, and to provide close combination with the coating layer and the printing substrate for preventing powder from coming off, thereby densifying the coating layer. Common adhesive may be poly(vinyl alcohol) (PVA), casein, rosin glue and paraffin glue. The adding amount of the additive depends on the particle size, shape and so on. However, the coating slurry added with too more adhesive is too viscous to spread, and the resulted coating layer has poor ink absorptivity. On the contrary, the coating slurry added with too less adhesive is too thin to fix the coating layer and the printing substrate, and the resulted coating layer suffers powder coming off and even peeling off.

Since the powder of the coating layer is silica (silicon dioxide)-based, and foreign countries control most technologies of powder production. Domestic industries acquire the material of the aforementioned coating layer only through import, and the cost is more expensive. Even though other powder substitutes silica, the resulted composite material hardly matches the requirements of quick printing, water resistance, and glossy surface. In the example of the most available silica-based coating layer applied on the paper, this coating layer hardly matches the requirement of glossy surface. Moreover, the silica is applied in the coating layer, the printout easily diffuses while suffering water, and the silica-based coating layer has poor water resistance. Furthermore, the silica-based coating slurry has less solid content, for example, 15% to 20%, and it consumes more time for coating and drying.

Hence, it is necessary to provide a surface coating slurry of digital printing having low cost, high ink absorptivity, water resistance, glossy or mat surface, so as to overcome the disadvantages of conventionally silica-based coating layer, for example, high technical cost, conventionally complicated cold coating process for forming a water resistance layer, long coating process time, poor printing quality and so on.

SUMMARY OF THE INVENTION

Accordingly, it is an aspect of the present invention to provide a composite printing medium for digital printing, which includes a substrate and a coating layer formed by a χ-alumina dispersion that comprises flaked porous χ-alumina nanoparticles evenly dispersing in water or acidic solution. The flaked porous χ-alumina nanoparticles are formed by subjecting gibbsite to thermal treating, physical wet-milling and/or mixing and pH adjusting processes, so as to obtain the χ-alumina dispersion containing flaked porous χ-alumina nanoparticles without gamma (γ)-alumina. Since the χ-alumina nanoparticles have high ink absorption and low cost, the coating layer formed by the χ-alumina dispersion has high water resistance and high ink absorptivity, they can be applied to the coating layer of the digital printing medium.

Moreover, a method of making composite printing medium for digital printing is provided, in which the aforementioned composite printing medium is coated on a substrate, so as to According to the aforementioned aspect of the present invention, a composite printing medium for digital printing is provided that comprises a substrate and a coating layer formed by evenly coating a coating slurry on a surface of the substrate. The coating slurry comprises χ-alumina dispersion without gamma (γ)-alumina, that is characterized by subjecting gibbsite to thermal treating, physical wet-milling and/or mixing and pH adjusting processes, so as to obtain the χ-alumina dispersion containing flaked porous χ-alumina nanoparticles, in which the flaked porous χ-alumina nanoparticles may have a specific surface area of 100 m$^2$/g to 220 m$^2$/g, an average thickness of 10 nm to 200 nm, an average cross-sectional diameter of 20 nm to 1000 nm, pore size over a surface of the flaked porous χ-alumina nanoparticles of 1 nm to 10 nm, a solid content of 20 wt. % to 40 wt. % and a pH value of 2 to 6, for example. Besides, a coating layer formed by the χ-alumina dispersion may have water resistance and an ink absorptivity of 1.5 mg/cm² to 1.8 mg/cm², for example.

In an embodiment of the present invention, the χ-alumina dispersion may be mixed with an adhesive to form a coating slurry. In an embodiment, the adhesive may include but be not limited in poly(vinyl alcohol) (PVA), casein, rosin glue or paraffin glue.

In an embodiment of the present invention, the aforementioned coating slurry can be coated, dried and formed to be a coating layer on a surface of a substrate. In an embodiment of the present invention, the aforementioned the surface of the substrate may include a material of paper, polymer, metal, ceramics, glass or textile.

In an embodiment of the present invention, the substrate having the aforementioned coating layer may serve as a composite printing medium for digital printing.

According the another aspect of the present invention, a method of making composite printing medium for digital printing is provided. The coating slurry comprises χ-alumina dispersion without gamma (γ)-alumina, that is characterized by subjecting gibbsite to thermal treating, physical wet-milling and pH adjusting processes, and the flaked porous χ-alumina nanoparticles have a specific surface area of 100 m²/g to 220 m²/g, an average thickness of 10 nm to 200 nm, an average cross-sectional diameter of 20 nm to 1000 nm and pore size over a surface of the flaked porous χ-alumina nanoparticles of 1 nm to 10 nm, and the χ-alumina dispersion has a solid content of 20 wt. % to 40 wt. % and a pH value of 2 to 6. Next, in which the adhesive is selected from the group consisted of poly(vinyl alcohol) (PVA), casein, rosin glue and paraffin glue.

In an example, the coating slurry without dyes and pigments has a solid content of 20 wt. % to 40 wt. %, a pH value of 2 to 6, and the coating layer formed by the coating slurry has water resistance and an ink absorptivity of 1.5 mg/cm² to 1.8 mg/cm². Later, the coating slurry is coated onto a surface of a substrate. An then, a drying process is performed that the coating slurry is subjected to the formation of a coating layer on the surface of the substrate.

With application to the aforementioned χ-alumina dispersion and coating slurry of digital printing medium containing the same, which include flaked porous χ-alumina nanoparticles with high specific surface area. Since the χ-alumina nanoparticles have high ink absorptivity and low cost, they can be applied to the coating layer of the digital printing medium.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1:
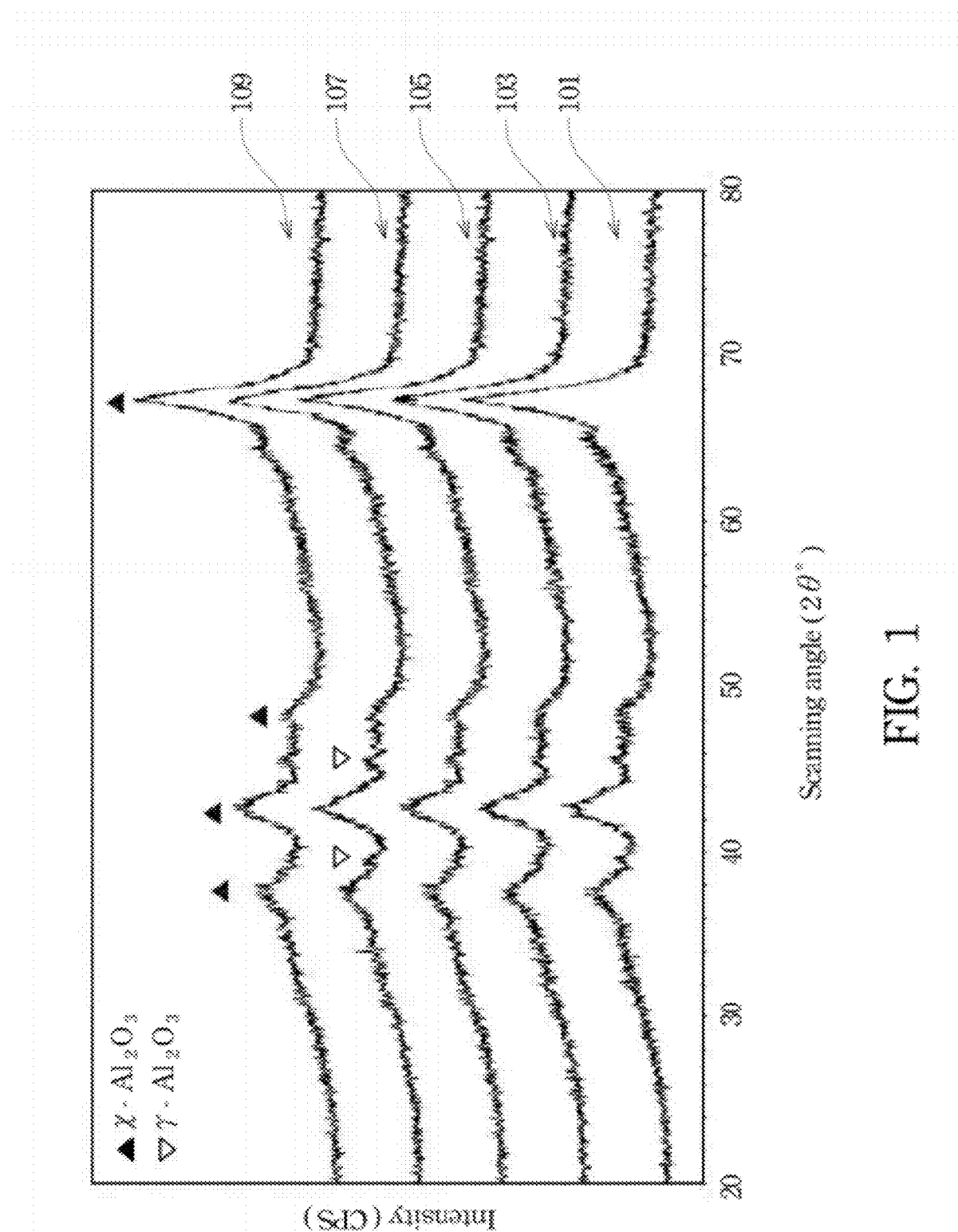
FIG. 1 is an XRD pattern of χ-alumina nanoparticles according to an embodiment of the present invention.

Accordingly, the present invention provides a χ-alumina dispersion, which is obtained by flaked porous χ-alumina nanoparticles with high specific surface area, high ink absorptivity and low cost, and it can be applied to the coating layer of the digital printing medium.

The "χ-alumina dispersion" herein is referred to a dispersion obtained by mixing χ-alumina with water or an acidic solution.

The "coating slurry" herein is referred to a coating slurry obtained by adding a suitable amount of an adhesive into χ-alumina dispersion.

The "composite printing medium" herein is referred to a composite printing medium having a coating layer that is formed by coating the coating slurry on the surface of a printing substrate, thereby applying for digital printing.

In detail, the χ-alumina dispersion is obtained by subjecting gibbsite to thermal treating, physical wet-milling and/or mixing and pH adjusting processes. In an embodiment, the thermal treating process (calcination) may subject gibbsite in a heating rate of 5° C./minutes (° C./min) to 15° C./min until a temperature of 400° C. to 1000° C., keeping it at the temperature for 30 minutes to 100 minutes, so as to transform to χ-alumina. In another embodiment, the thermal treating process may subject gibbsite in a heating rate of 8° C./min to 12° C./min until a temperature of 500° C. to 800° C., keeping it at the temperature for 50 minutes to 90 minutes, so as to transform to χ-alumina. In a still another embodiment, the thermal treating process may subject gibbsite in a heating rate of about 10° C./min until a temperature of about 600° C., keeping it at the temperature for 70 minutes to 90 minutes, so as to transform to χ-alumina.

Next, the resulted χ-alumina may be subjected to a physical wet-milling process. In an embodiment, the χ-alumina may be mixed with water or an acidic solution to form a dispersion with a solid content of 20 wt. % to 40 wt. %, and then it may be milled by an ceramic beads with an average diameter of 0.3 mm to 2.0 mm, under a milling rate of 2000 rounds to 4000 rounds per minute, under an environment having a temperature of 5° C. to 40° C. and a pH of 3 to 5, for 80 minutes to 160 minutes, for example. During the physical wet-milling, the process provides the resulted χ-alumina with shear force, impact force and the like. In an embodiment, the χ-alumina may be mixed with water or an acidic solution to form the dispersion with a solid content of about 30 wt. %, and then it may be milled by grinding beads with an average diameter of 0.3 mm to 0.4 mm, under a milling rate of 2500 rounds to 3000 rounds per minute, under an environment having a temperature of 15° C. to 30° C. and a pH of 4 to 5, for 80 minutes to 160 minutes, for example.

The suitable acidic solution for using in physical wet-milling and pH adjusting processes may be an inorganic or organic acidic solution. In an embodiment, the inorganic acidic solution may be an acidic solution of nitric acid ($HNO_3$), sulfuric acid ($H_2SO_4$), phosphoric acid ($H_3PO_4$), or hydrochloric acid (HCl), for example. The organic acidic solution may be an acidic solution of formic acid, acetic acid ($CH_3COOH$), propionic acid, oxalic acid or malonic acid, for example.

In an embodiment, the physical wet-milling process may be performed in a conventionally milling apparatus. In an embodiment, the suitable milling apparatus may be pearl mill, agitated media mill, dispersion mill, high-shear mill, ball mill and so on. In another embodiment, the suitable milling apparatus may be pearl mill. Additionally, the grinding media may include a material of zirconium oxide, alumina, yttrium oxide, zirconium oxide stabilized with yttrium or any combination thereof. In an embodiment, the grinding medium may include about 92 wt. % of zirconium oxide, about 5 wt. % of yttrium oxide, and about 3 wt. % of other substances.

The resulted $\chi$-alumina dispersion includes flaked porous $\chi$-alumina nanoparticles, in which the $\chi$-alumina nanoparticles may have a specific surface area of 100 $m^2$/g to 220 $m^2$/g, an average thickness of 10 nm to 200 nm, an average cross-sectional diameter of 20 nm to 1000 nm, and pore size over a surface of the flaked porous $\chi$-alumina nanoparticles of 1 nm to 10 nm. In another embodiment, the $\chi$-alumina nanoparticles may have an average thickness of 10 nm to 200 nm. In still another embodiment, the $\chi$-alumina nanoparticles may have an average thickness of 10 nm to 50 nm.

Later, the physically wet-milled $\chi$-alumina dispersion is stilly placed (aging process) for a period of time, thereby the pH value of the milled $\chi$-alumina dispersion may reach 4 to 5. Subsequently, a pH adjusting process is performed, in which the pH of the aged $\chi$-alumina dispersion is adjusted by using an inorganic or organic acidic solution that has the same pH value as the aged $\chi$-alumina dispersion, and the $\chi$-alumina dispersion has a solid content of 20 wt. % to 40 wt. %. The aforementioned inorganic or organic acidic solution utilized in pH adjusting process may be an inorganic acidic solution such as nitric acid, sulfuric acid, phosphoric acid, or hydrochloric acid, or an organic acidic solution such as formic acid, acetic acid, propionic acid, oxalic acid or malonic acid. It is noted that the $\chi$-alumina dispersion is kept at a pH value of 2 to 6, so as to maintain the $\chi$-alumina nanoparticles dispersing well and to prevent them from aggregating in a mass.

Since the resulted $\chi$-alumina nanoparticles in the $\chi$-alumina dispersion has a flaked porous structure, a specific surface area of 100 $m^2$/g to 220 $m^2$/g, an average thickness of 10 nm to 200 nm, an average cross-sectional diameter of 20 nm to 1000 nm, and pore size over a surface of the flaked porous $\chi$-alumina nanoparticles of 1 nm to 10 nm. The $\chi$-alumina nanoparticles have an ink absorptivity index of 5 to 10 (i.e. ink absorptivity of 1.5 mg/$cm^2$ to 1.8 mg/$cm^2$) beneficially for absorbing dyes and pigments. In subsequent application, an appropriate amount of the adhesive may be added into the $\chi$-alumina dispersion to form a coating slurry for digital printing instead of the conventional silica-based coating layer with disadvantages of high technical cost and difficulty in production of glossy papers.

In an embodiment, the $\chi$-alumina dispersion may further be added with an adhesive while it is applied in the coating slurry of digital printing. The adhesive may include but be not limited in poly(vinyl alcohol) (PVA), casein, rosin glue or paraffin glue, and the adhesive may have an amount of 8 wt. % to 20 wt. % in the coating slurry of digital printing.

While the $\chi$-alumina dispersion is applied in the coating slurry of digital printing, the $\chi$-alumina dispersion, the coating slurry is evenly coated, dried and formed to be a coating layer on a surface of a printing substrate, in which conventional coating methods can be utilized rather than addressing the related details herein. In an embodiment, the material of the substrate is not limited herein, however, the surface of the substrate may include but not be limited in a material of paper, polymer, metal, ceramics, glass or textile. After the coating slurry is evenly coated on the surface of the substrate, the drying process is performed, in which the substrate (for example, paper, polymer, metal, ceramics, glass or textile) coated with the coating slurry is put into an environment under 100° C. to 120° C. for 2 minutes to 10 minutes, for example, so as to remove the water in the coating slurry. While the substrate coated with the coating slurry is cooled, the composite printing medium is obtained. It is worth mentioning that, the coating layer formed by the coating slurry of the digital printing inherently has water resistance, and the coating slurry can be formed to be glossy or mat coating. Hence, the conventional and complicated cold coating process for forming a water resistance layer can be omitted while the coating layer formed by the coating slurry of the present invention is applied.

Thereinafter, various applications of the present invention will be described in more details referring to several exemplary embodiments below, while not intended to be limiting. Thus, one skilled in the art can easily ascertain the essential characteristics of the present invention and, without departing from the spirit and scope thereof, can make various changes and modifications of the invention to adapt it to various usages and conditions.

EXAMPLE 1

Preparation of $\chi$-Alumina Nanoparticles and Dispersion Thereof

EXAMPLE 1 is related to prepare $\chi$-alumina nanoparticles and dispersion thereof. Firstly, gibbsite powder (Model No. M010, Beaming Co. Ltd., Taiwan) is heated in a covered alumina crucible in a heating rate of 5° C./min to 15° C./min until a temperature of 400° C. to 1000° C., keeping it at the temperature for 30 minutes to 100 minutes, so as to transform to $\chi$-alumina. Or, the gibbsite powder is heated in the covered alumina crucible in a heating rate of 8° C./min to 12° C./min until a temperature of 500° C. to 700° C., keeping it at the temperature for 50 minutes to 90 minutes, so as to transform to $\chi$-alumina. Alternatively, the gibbsite powder is heated in the covered alumina crucible in a heating rate of about 10° C./min until a temperature of 600° C., keeping it at the temperature for 70 minutes to 90 minutes, so as to transform to $\chi$-alumina.

Next, the resulted $\chi$-alumina may be subjected to a physical wet-milling process. In this embodiment, the $\chi$-alumina may be mixed with an acidic solution, for example, the nitric solution, to form $\chi$-alumina dispersion with a solid content of 20 wt. % to 40 wt. % and a pH of 3 to 5. And then, the $\chi$-alumina dispersion is milled in Laboratory Perl Mill® (Model No. PML-H/V, Bühler & Drais GmbH, Germany) or the like, by using grinding medium such as ceramic beads with an average diameter of 0.3 mm to 2.0 mm, under a milling rate of 2000 rounds to 4000 rounds per minute, under an environment having a temperature of 15° C. to 30° C. for 80 minutes to 160 minutes, for example. Alternatively, the χ-alumina dispersion is physically wet-milled by ceramic beads with an average diameter of 0.3 mm to 0.4 mm under a milling rate of 2500 rounds to 3000 rounds per minute for 80 minutes to 160 minutes, for example. Additionally, the grinding medium may include a material of zirconium oxide, alumina, yttrium oxide, zirconium oxide stabilized with yttrium or any combination thereof, and the grinding medium may include about 92 wt. % of zirconium oxide, about 5 wt. % of yttrium oxide, and about 3 wt. % of other substances.

The crystal phase of the well-milled χ-alumina dispersion is analyzed by Miniflex benchtop X-Ray Diffraction (XRD) system (Rigaku International Corporation) according to the corresponding JPCDS standard card for Cu target ($K_{\alpha 1}$, λ=1.540598 Å) under room temperature, 30 kV of a voltage and 15 mA of a current. The scanning speed of the XRD system is 4° per minute, and the scanning angle (2θ°) of which is 20° to 80°. The measured data is analyzed by MDI (Material Data Inc.) Jade 5.0 XRD software. Reference is made to FIG. 1, which is an XRD pattern of χ-alumina nanoparticles according to an embodiment of the present invention, in which the vertical axis refers to the intensity (counts per second; cps) of X-rays, the horizontal axis refers to the scanning angle (2θ°), the symbol ▲ refers to χ-alumina, the symbol ∇ refers to γ-alumina, the curve 101 refers to un-milled gibbsite, the curve 103 refers to χ-alumina milled for about 80 minutes, the curve 105 refers to χ-alumina milled for about 100 minutes, the curve 107 refers to χ-alumina milled for about 120 minutes, and the curve 109 refers to χ-alumina milled for about 140 minutes. According to the crystal phase identification result of FIG. 1, the flaked porous χ-alumina nanoparticles are obtained by milling the calcined gibbsite for about 140 minutes.

Moreover, the specific surface area of the χ-alumina nanoparticles of EXAMPLE 1 is 100 $m^2$/g to 220 $m^2$/g, which is measured by Gemini 2360 BET specific surface area analyzer (Micromeritics Instrument Corporation, U.S.A.) according to Brunauer-Emmett-Teller (BET) method.

Figure 2:
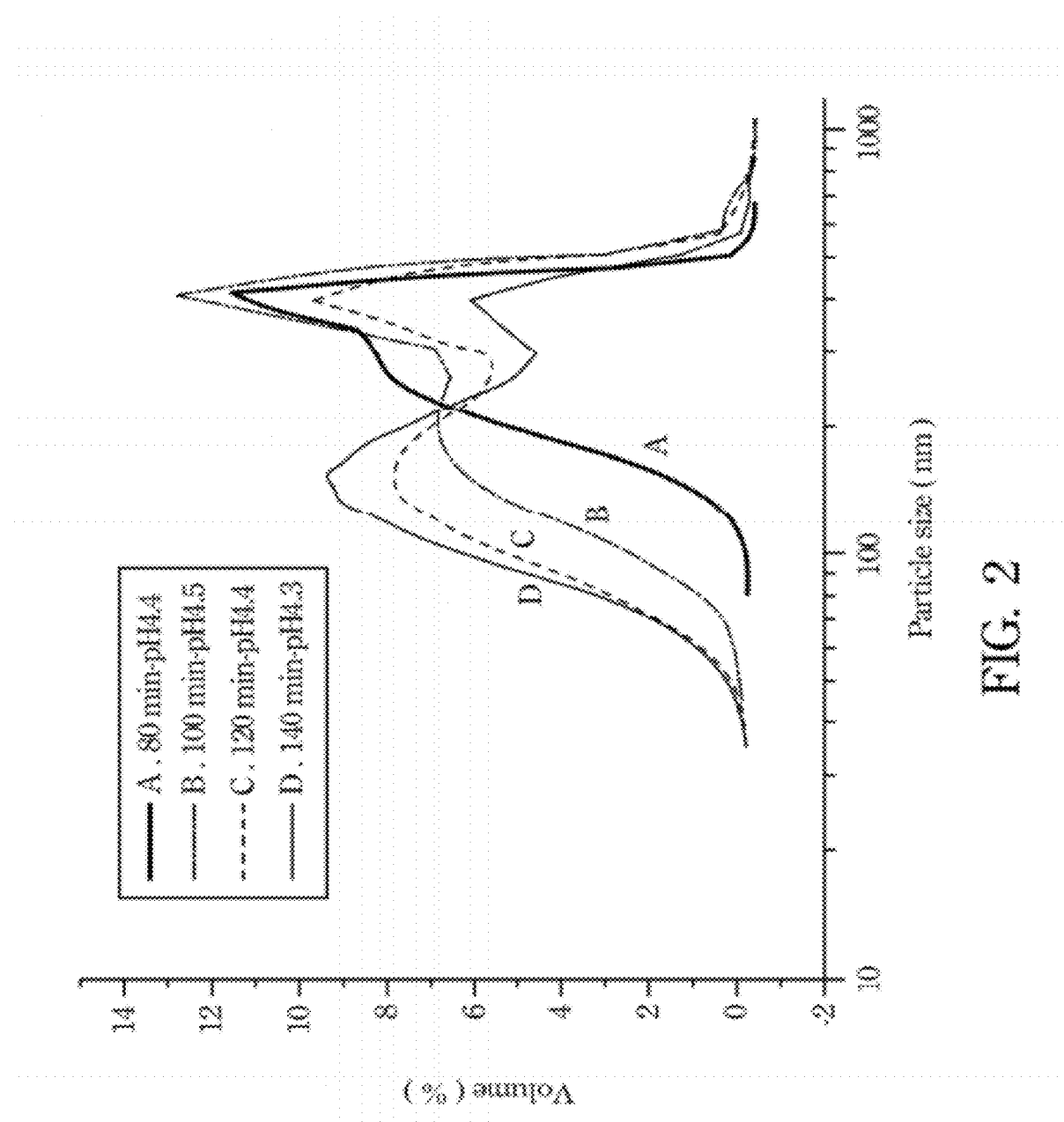
FIG. 2 depicts a particle size analysis diagram of the flaked porous χ-alumina nanoparticles according to an embodiment of the present invention.

Furthermore, the particle size of the milled χ-alumina nanoparticles is analyzed using Laser particle size analyzer, for example, Zetasizer 1000 (Malvern, U.K.). Reference is made to FIG. 2, which depicts a particle size analysis diagram of the χ-alumina nanoparticles according to an embodiment of the present invention, in which the curve A is a measured result of the porous flaked χ-alumina nanoparticles milled at above pH 4.4 for about 80 minutes, the curve B is a measured result of the flaked porous χ-alumina nanoparticles milled at above pH 4.5 for about 100 minutes, the curve C is a measured result of the flaked porous χ-alumina nanoparticles milled at above pH 4.4 for about 120 minutes, and the curve D is a measured result of the flaked porous χ-alumina nanoparticles milled at above pH 4.3 for about 140 minutes. According to the DLS particle size analyzing result of FIG. 2, the average particle size of the flaked porous χ-alumina nanoparticles of this EXAMPLE is 100 nm to 200 nm. In another embodiment, the average particle size of the flaked porous χ-alumina nanoparticles of this EXAMPLE is approximate 150 nm.

Figure 3:
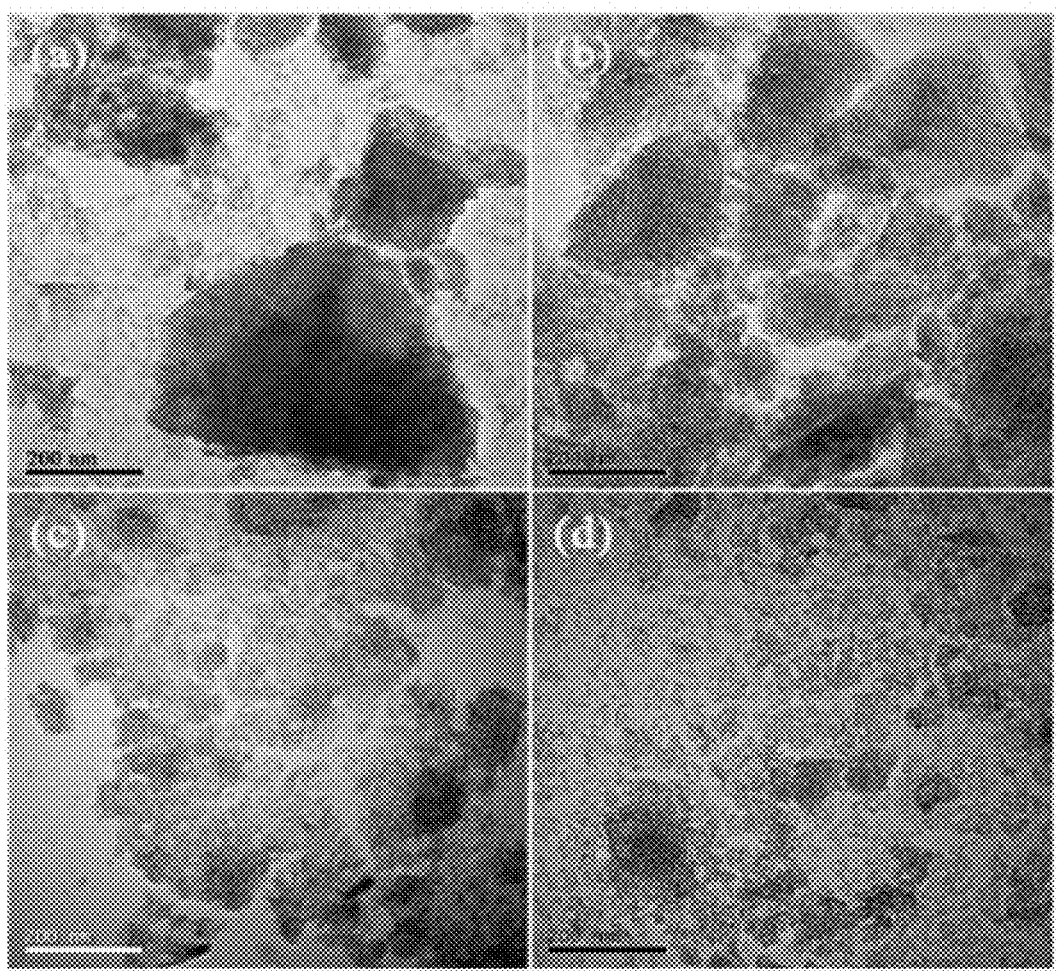
FIGS. 3(a) to 3(d) are TEM photos of the flaked porous χ-alumina nanoparticles according to several embodiments of the present invention.

Besides, the external appearance, for example, micro-crystal or micro-pore, of the flaked porous χ-alumina nanoparticles of this EXAMPLE is observed by transmission electron microscope (TEM), for example, field emission (FE)-TEM (Model No.: HF-2000, Hitachi Co. Ltd., Japan). In addition, the microstructure of the original gibbsite is further observed by scanning electron microscope (SEM), for example, FE-SEM (Model No.: S4100, Hitachi Co. Ltd., Japan). Reference is made to FIGS. 3(a) to 3(d), which are TEM photos of the flaked porous χ-alumina nanoparticles according to several embodiments of the present invention. FIG. 3(a) is a TEM photo of the flaked porous χ-alumina nanoparticles milled under about pH 4.4 for about 80 minutes. FIG. 3(b) is a TEM photo of the flaked porous χ-alumina nanoparticles milled under about pH 4.5 for about 100 minutes. FIG. 3(c) is a TEM photo of the flaked porous χ-alumina nanoparticles milled under about pH 4.4 for about 120 minutes. FIG. 3(d) is a TEM photo of the flaked porous χ-alumina nanoparticles milled under about pH 4.3 for about 140 minutes. According to the results of FIGS. 3(a) to 3(d), the χ-alumina nanoparticles milled for about 80 minutes to 100 minutes have significantly hexagonal flaked appearance. However, the χ-alumina nanoparticles milled longer have mostly broken flakes, as shown in FIGS. 3(c) to 3(d).

Figure 4:
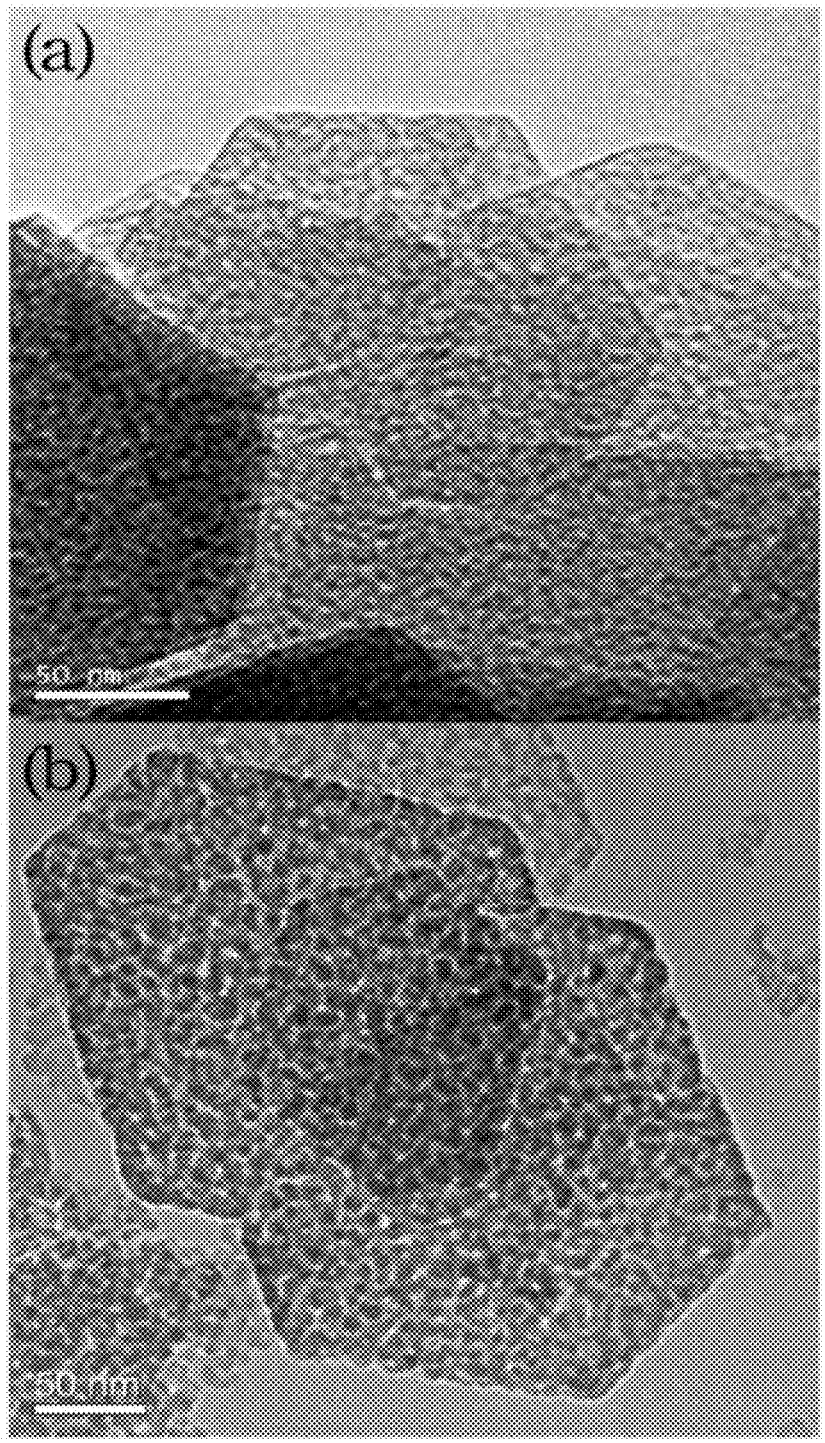
FIGS. 4(a) to 4(b) are TEM photos of the external appearance of the flaked porous χ-alumina nanoparticles according to an embodiment of the present invention.

In addition, the micro-pores on the surface of the flaked porous χ-alumina nanoparticles of this EXAMPLE are further observed by using the same FE-TEM as above. Reference is made to FIGS. 4(a) to 4(b), which are TEM photos of the external appearance of the flaked porous χ-alumina nanoparticles according to an embodiment of the present invention. FIG. 4(a) is a TEM photo of the flaked porous χ-alumina nanoparticles milled under about pH 4 for about 80 minutes. FIG. 4(b) is a TEM photo of the flaked porous χ-alumina nanoparticles milled under about pH 4.5 for about 80 minutes. According to the results of FIGS. 4(a) to 4(b), micro-pores evidently distribute over the surface of the χ-alumina nanoparticles.

Figure 5:
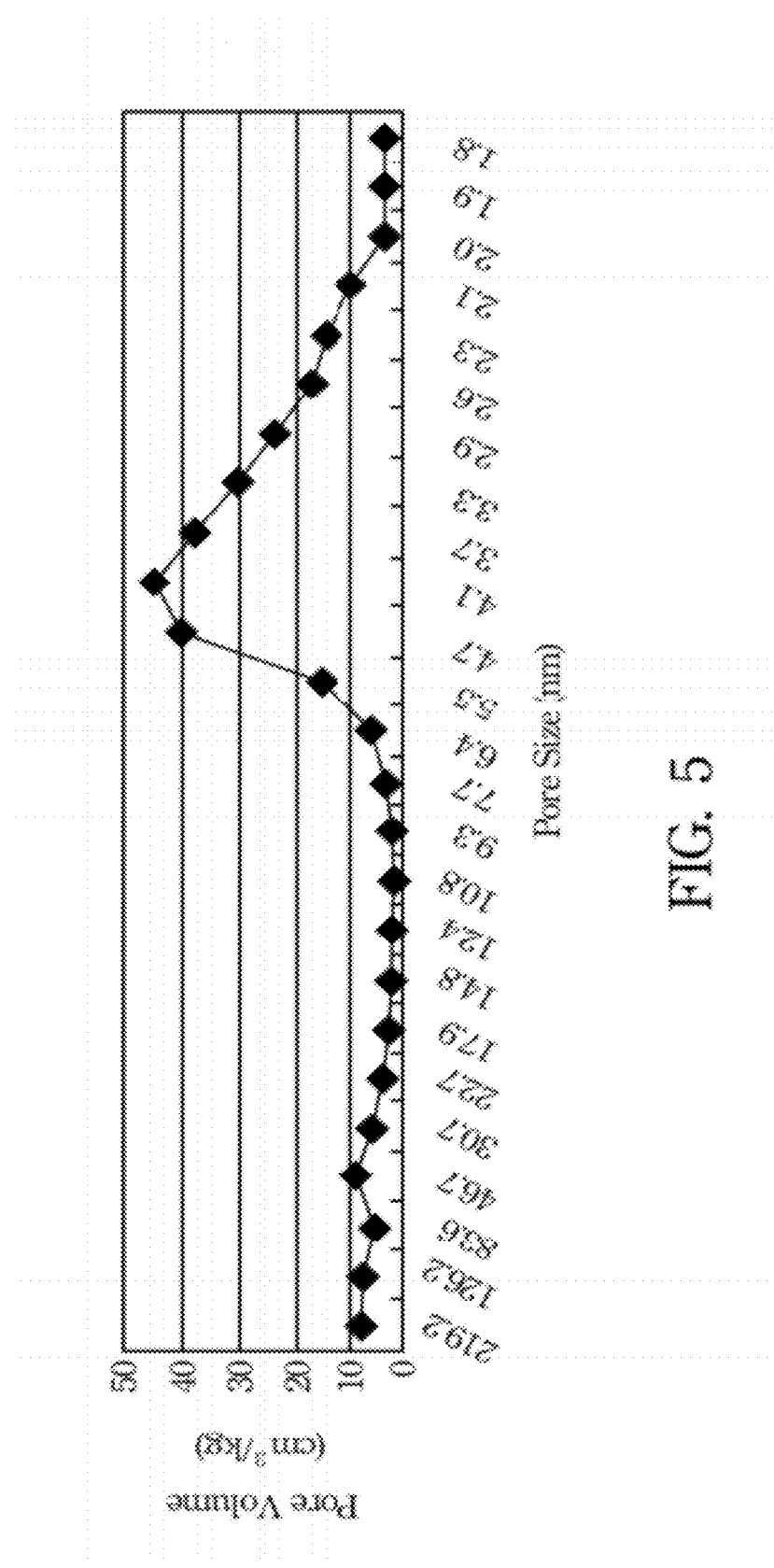
FIG. 5 depicts a curve diagram of pore size of the flaked porous χ-alumina nanoparticles according to an embodiment of the present invention
Figures 6A, 6B, 6C:
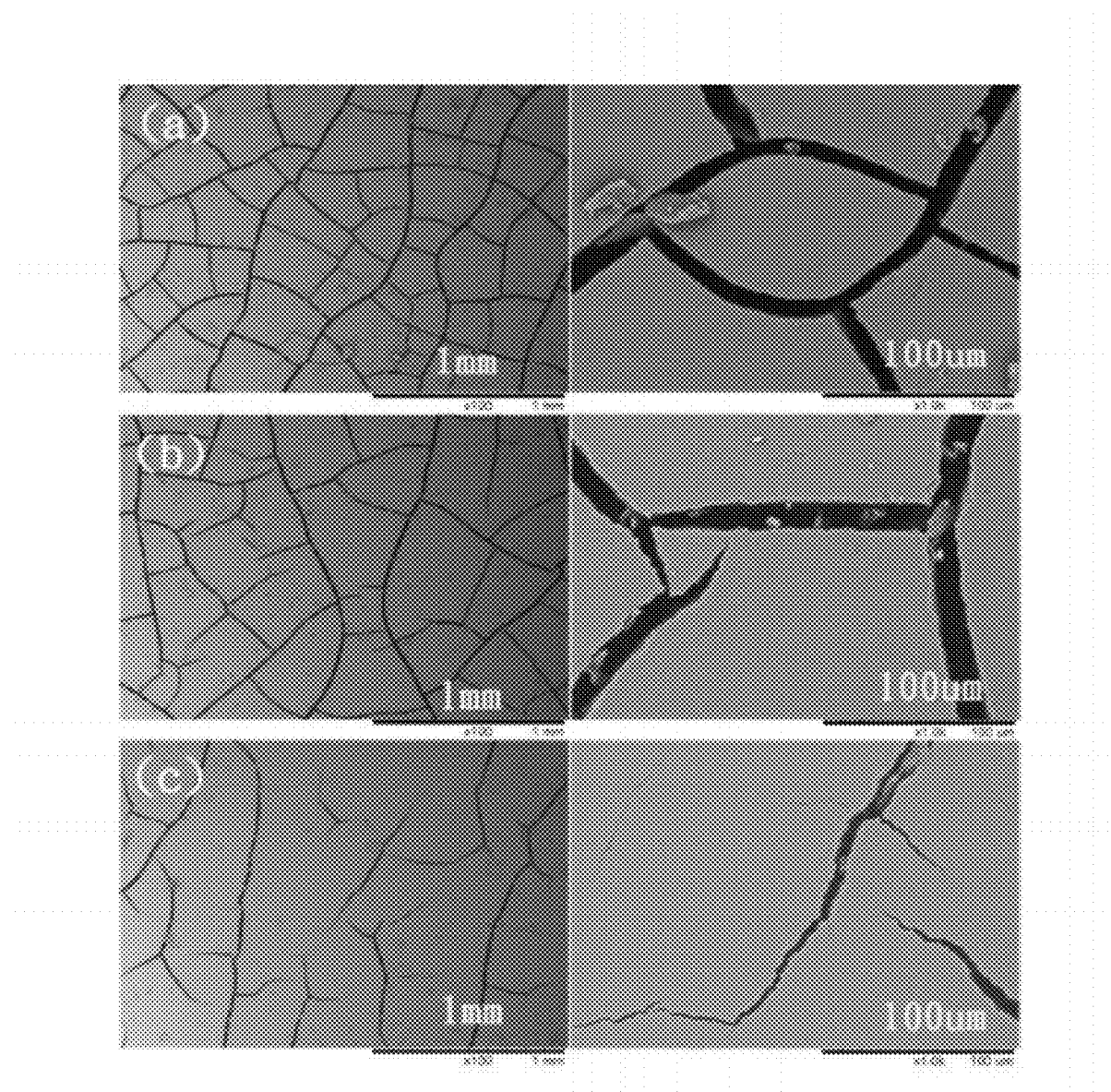
FIGS. 6(a) to 6(f) are SEM photos of the coating layer of the composite printing medium according to an embodiment of the present invention (the photos of the left column magnified 100-fold and the ones of the right column magnified 1000-fold).
Figures 6D, 6E, 6F:
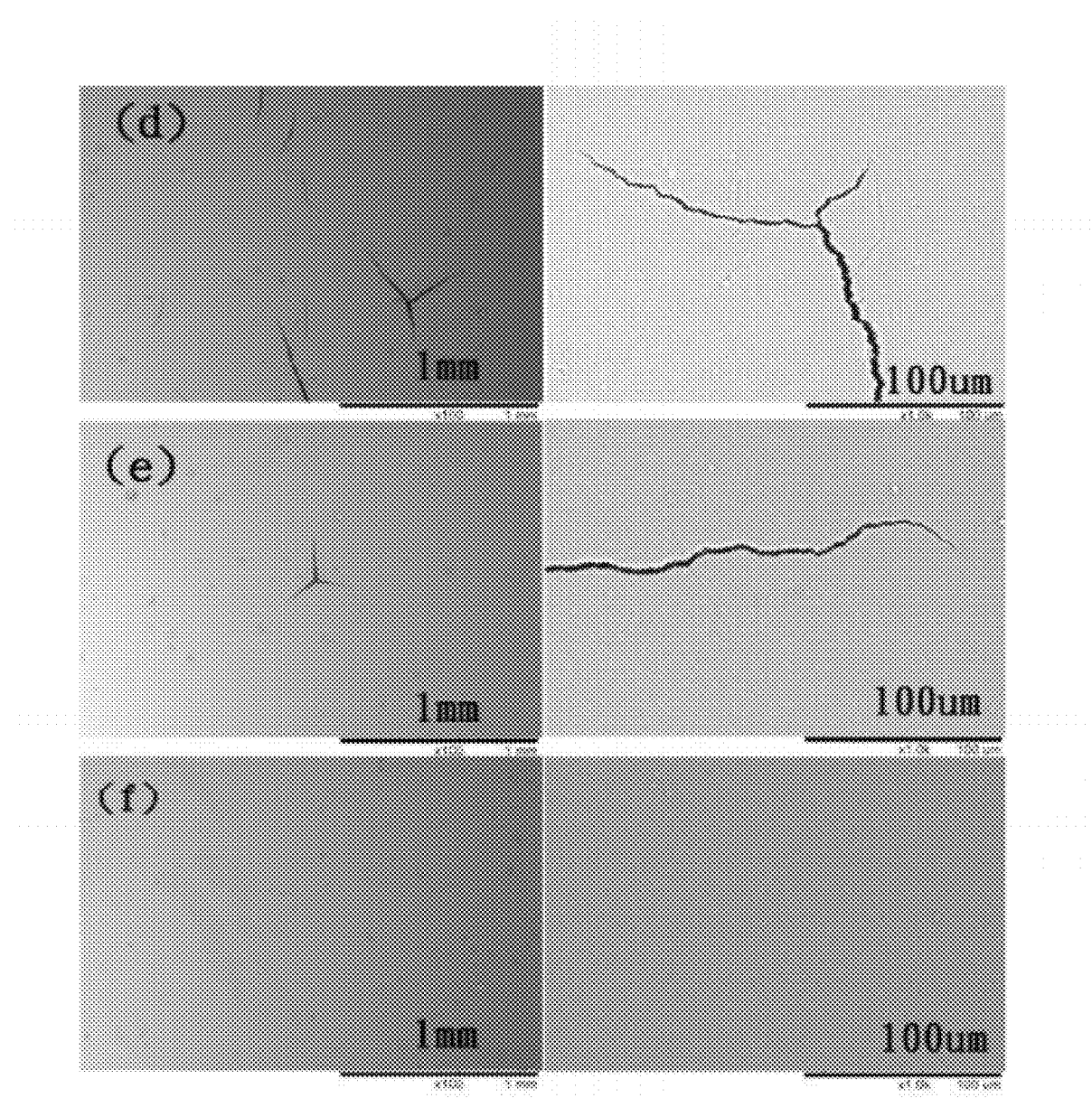

Moreover, the pore size of the flaked porous χ-alumina nanoparticles are further measured by using a porosimeter, for example, Accelerated Surface Area and Porosimetry (ASAP) system (Model No. ASAP 2010, Micromeritics Inc., Norcross, Ga., US). Reference is made to FIG. 5, which depicts a curve diagram of pore size of the flaked porous χ-alumina nanoparticles according to an embodiment of the present invention, in which the vertical axis refers to pore volume ($cm^3$/kg) of the flaked porous χ-alumina nanoparticles, and the horizontal axis refers to pore size (nm). According to the results of FIG. 5, pore size of the flaked porous ralumina nanoparticles may range from 1 nm to 10 nm.

EXAMPLE 2

Preparation of Coating Slurry of Digital Printing

EXAMPLE 2 is related to prepare a coating slurry of digital printing, so as to form composite printing medium. In this EXAMPLE, the χ-alumina dispersion obtained in EXAMPLE 1 is stilly placed (aging process) for a period of time, thereby the pH value of the χ-alumina dispersion obtained in EXAMPLE 1 may reach 4 to 5. Subsequently, a pH adjusting process is performed, in which the pH of the aged χ-alumina dispersion is adjusted by using an inorganic or organic acidic solution that has the same pH value as the aged χ-alumina dispersion. The suitable inorganic or organic acidic solution utilized in pH adjusting process may be an inorganic acidic solution such as nitric acid, sulfuric acid, phosphoric acid, or hydrochloric acid, or an organic acidic solution such as formic acid, acetic acid, propionic acid, oxalic acid or malonic acid. The resulted χ-alumina dispersion has a solid content of 20 wt. % to 40 wt. %.

Later, the aged χ-alumina dispersion is evenly coated, dried and formed to a coating layer on the surface of the substrate, for example, on the paper or paper containing polyethylene (PE), by using carious conventionally coating method such as a coating rod (Model No.: RD75, Chuan-Hua Precision Co., Taiwan). The coating slurry on the surface of the substrate is coated in a thickness of 100 μm to 300 μm. Alternatively, the aged χ-alumina dispersion may further be added with an adhesive such as PVA having an amount of 8 wt. % to 20 wt. % therein. In an embodiment, the aged χ-alumina dispersion may further be added with an adhesive having an amount of 16 wt. % to 20 wt. % therein, for forming a coating slurry. And then, the substrate coated with the aged χ-alumina dispersion or coating slurry is put into an environment such as an oven under 100° C. to 120° C. for 2 minutes to 10 minutes, for example, so as to remove the solvent in the dispersion or coating slurry. Subsequently, the surface gloss, surface densification and ink absorptivity of the composite printing medium obtained in EXAMPLE 2 can be further evaluated.

Reference is made to Table 1, which is an surface gloss comparison of the composite printing medium comparing with commercial glossy photo paper. The commercial glossy photo paper has a coating layer that includes about 24 wt. % solid content of boehmite adding with about 18 wt. % of PVA. The composite printing medium of EXAMPLE 2 has a coating layer that includes about 30 wt. % solid content of χ-alumina nanoparticles adding with about 18 wt. % of PVA, in which the χ-alumina nanoparticles are milled for various time. According to the result of Table 1, the coating layer has higher surface gloss and reflectivity while it is formed by the χ-alumina nanoparticles that are milled longer and have finer particle size.

TABLE 1

| Material of Coating Layer | Surface Gloss of Coating Layer (%) |
| --- | --- |
| Boehmite | 45~50 |
| χ-alumina nanoparticles milled for about 80 minutes | 34~38 |
| χ-alumina nanoparticles milled for about 100 minutes | 40~42 |
| χ-alumina nanoparticles milled for about 120 minutes | 44~46 |
| χ-alumina nanoparticles milled for about 140 minutes | 48~50 |

Reference is made to FIGS. 6(a) to 6(f), which are SEM photos of the coating layer of the composite printing medium according to an embodiment of the present invention (the photos of the left column magnified 100-fold and the ones of the right column magnified 1000-fold), in which the coating layer is formed by a coating slurry comprising about 30 wt. % solid content of the χ-alumina nanoparticles milled for about 140 minutes and added with 8 wt. % to 18 wt. % of PVA. The PVA added in the coating layer of FIGS. 6(a) to 6(f) is about 8 wt. % (FIG. 6(a)), about 10 wt. % (FIG. 6(b)), about 12 wt. % (FIG. 6(c)), about 14 wt. % (FIG. 6(d)), about 16 wt. % (FIG. 6(e)), and about wt. % (FIG. 6(f)), respectively. The surface cracks in the coating layer are observed by using SEM, for example, FE-SEM (Model No.: S4100, Hitachi Co. Ltd., Japan), and the percentage (%) of the surface crack area with respect to total surface area is calculated by using an image analyzing software, for example, Lucia Measurement Software on VGA (Version 4.81, Laboratory Imaging, Czech Republic). According to the results of FIGS. 6(a) to 6(f), the surface cracks in the coating layer are significantly reduced while the PVA added in the coating layer is about 14 wt. % (FIG. 6(d)) or more.

Figure 7:
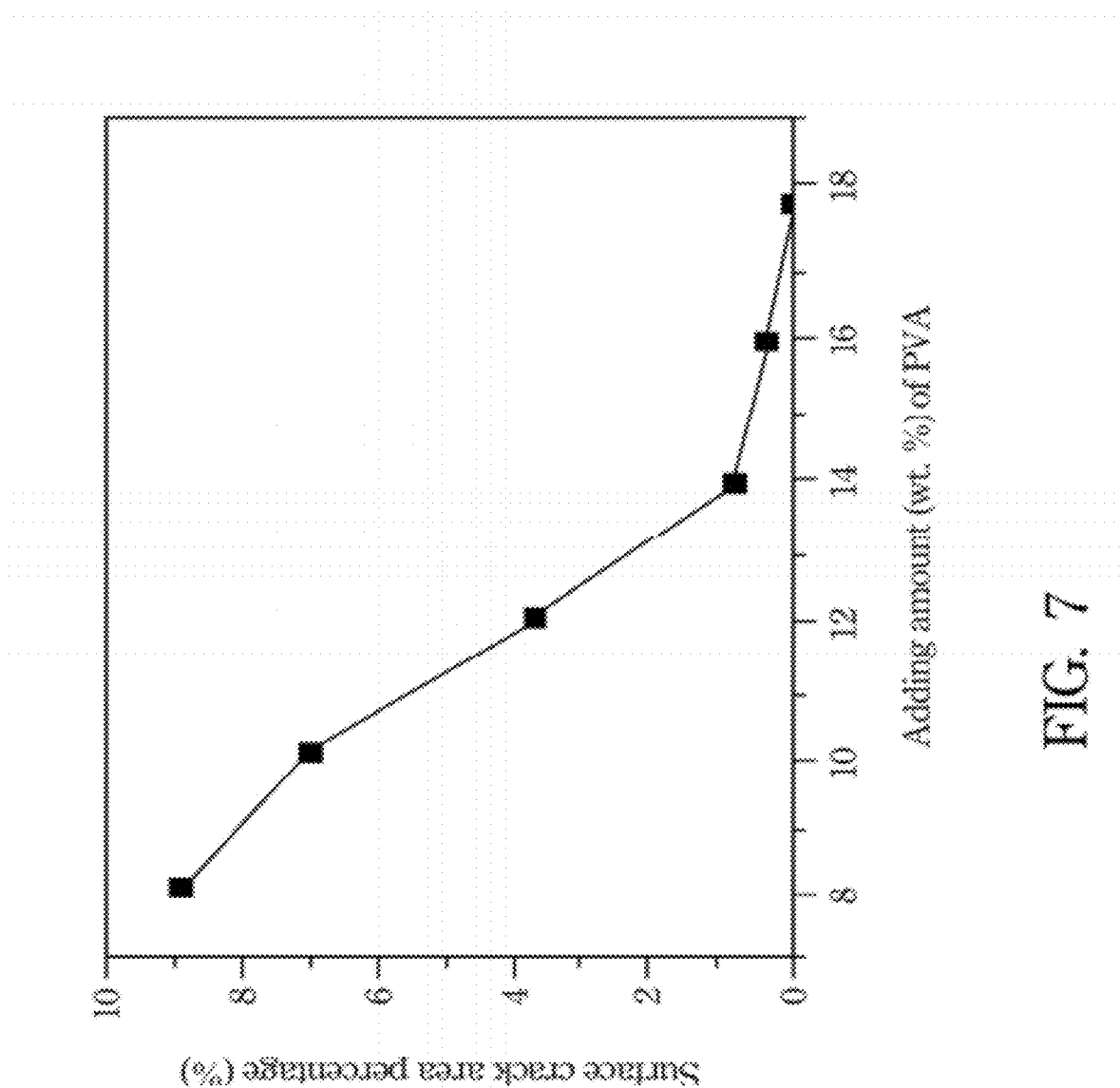
FIG. 7 depicts a curve diagram of the percentage of the surface crack area in the coating layer of the composite printing medium with respect to total surface area according to an embodiment of the present invention.

Reference is made to FIG. 7, which depicts a curve diagram of the percentage of the surface crack area in the coating layer of the composite printing medium with respect to total surface area according to an embodiment of the present invention, in which the vertical axis refers to the percentage (%) of the surface crack area, the horizontal axis refers to the added amount (wt. %) of PVA. According to FIG. 7 evidenced by FIG. 4(f), the surface of the coating layer is compact without crack while the added amount (wt. %) of PVA is about 18 wt. %. Besides, the ink absorptivity of the coating layer is evaluated by using commercial printer, for example, Epson R290 ink printer. The ink absorption degree is evaluated by 10 indices ranking from 0 to 9 indices, which are corresponding to 55% to 100% of the relative percentage of the color density of red (M+Y), according to four printing colors C (Cyan), M (Magenta), Y (Yellow), and K (blacK), and the higher index refers to denser color and higher ink absorption degree per unit area.

Figure 8:
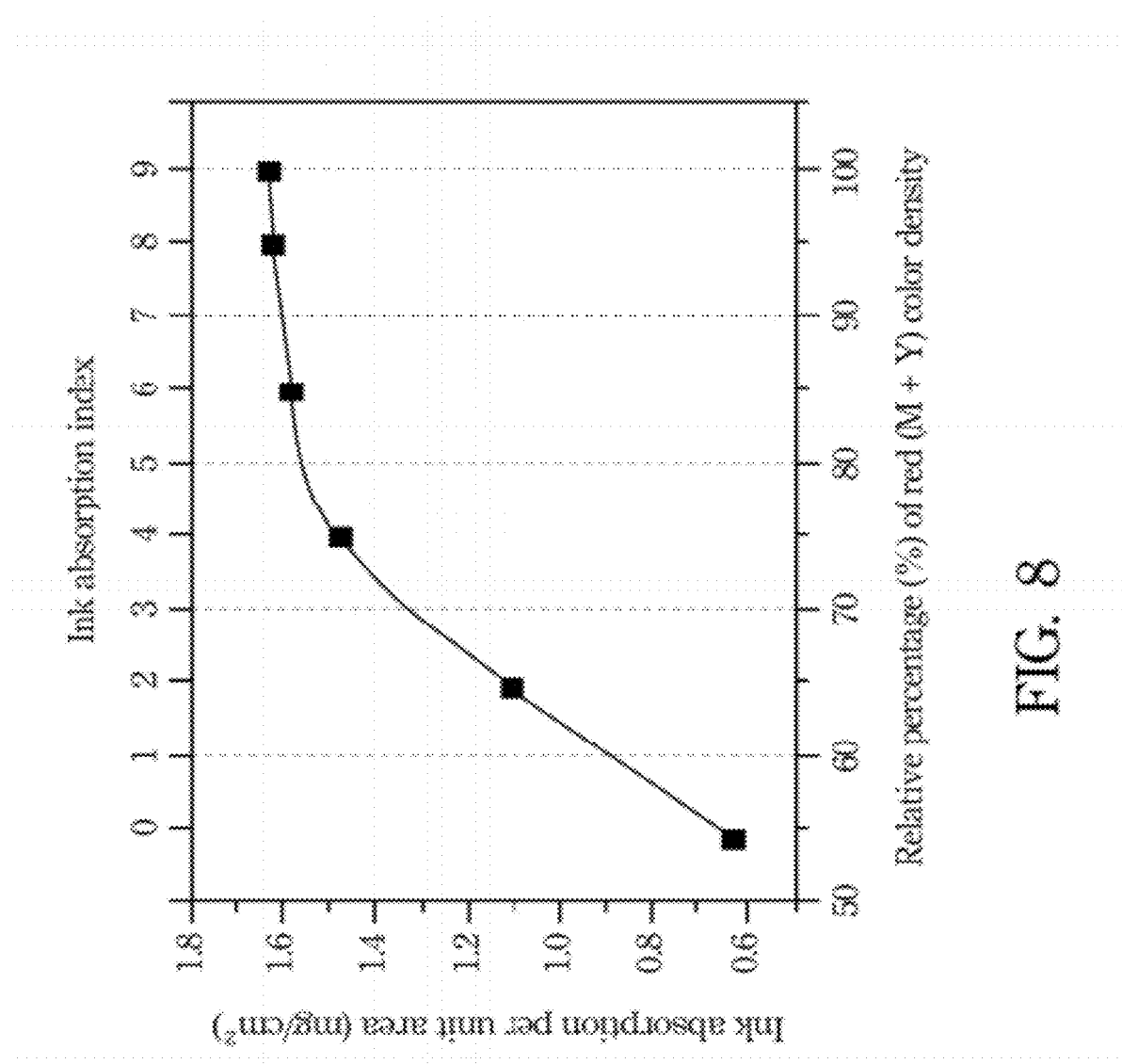
FIG. 8 depicts a standard curve diagram of the ink absorption degree per unit area with respect to the color density printed on the coating layer of the composite printing medium according to an embodiment of the present invention.

Reference is made to FIG. 8, which depicts a standard curve diagram of the ink absorption degree per unit area with respect to the color density printed by Epson R290 ink printer on the coating layer of the composite printing medium according to an embodiment of the present invention. Since Epson R290 ink printer prints and tests on the coating layer of the composite printing medium of an embodiment of the present invention; the relationship of the ink absorption degree per unit area with respect to the color density of can be calculated as FIG. 8, in which the ink absorption index is determined by observing the relative percentage of red (M+Y) color density where ink diffusion of printout nearly occurs.

Figure 9:
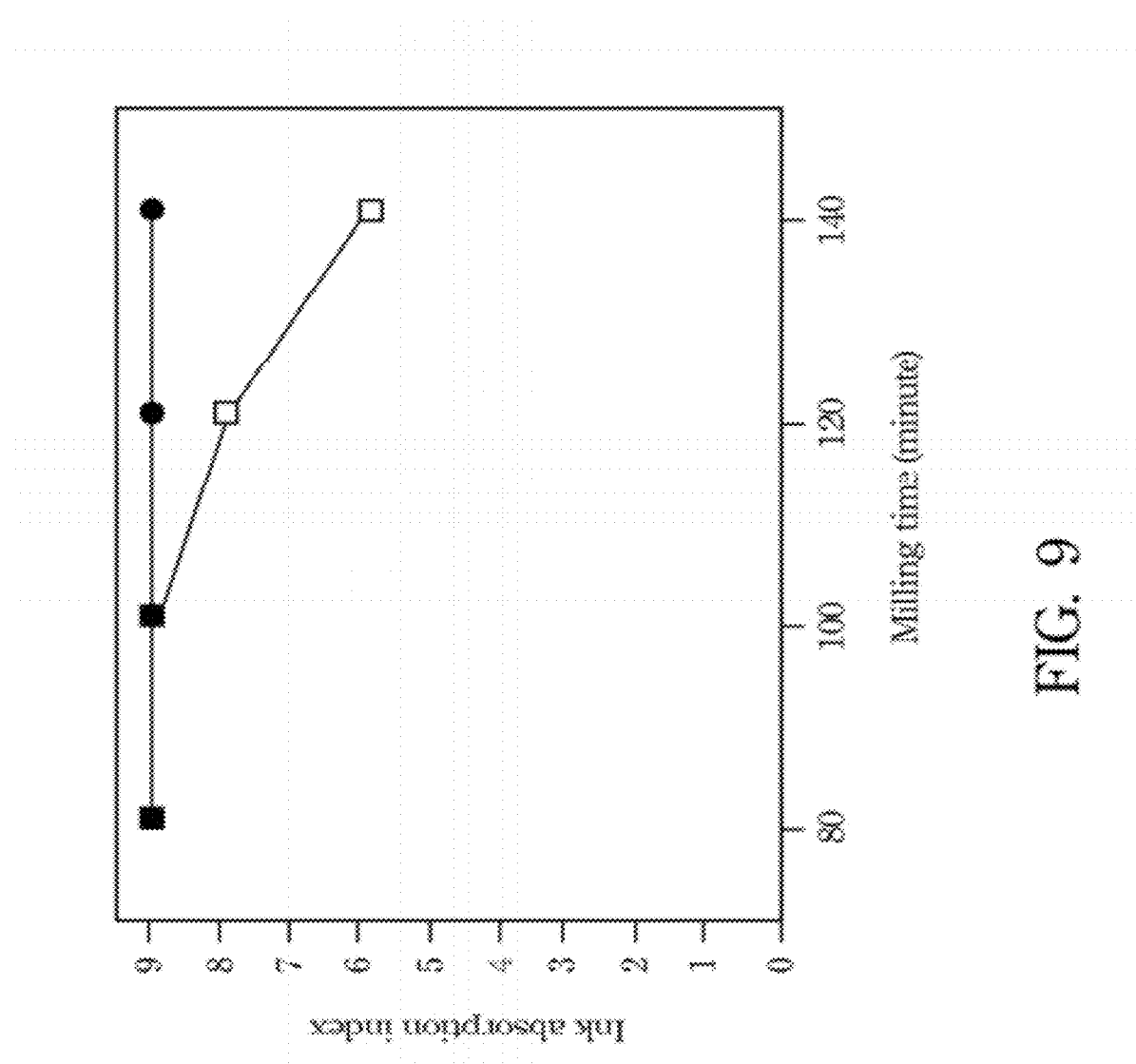
FIG. 9 depicts a curve diagram of the ink absorption index of the coating layer of the composite printing medium according to an embodiment of the present invention.

Reference is made to FIG. 9, which depicts a curve diagram of the ink absorption index of the coating layer of the composite printing medium according to an embodiment of the present invention, in which the vertical axis refers to the ink absorption index, and the horizontal axis refers to milling time (minute) of the χ-alumina nanoparticles, the symbol □ refers to the coating layer including χ-alumina nanoparticles (about 30 wt. % solid content added with about 8 wt. % PVA) milled but not still placed (un-aged), and the symbol ● refers to the coating layer including χ-alumina nanoparticles (about 30 wt. % solid content added with about 8 wt. % PVA) milled and still placed (aged). According to the result of FIG. 9, the coating layer formed by the aged χ-alumina nanoparticles keeps an ink absorption index of about 9 (the ink absorptivity of 1.5 mg/cm$^2$ to 1.8 mg/cm$^2$).

By the way, it is necessarily supplemented that, the specific substrate, specific acids, specific adhesive, specific printer and the like are employed as exemplary embodiments in the present invention for evaluating the χ-alumina dispersion and the coating layer of digital printing medium using the same of the present invention, however, as is understood by a person skilled in the art, the different substrate, different acids, different adhesive, and different printer can be employed in the present invention and be any combined thereof rather than limiting to the aforementioned examples. Moreover, the gloss of the coating layer on the digital printing substrate, for example, glossy (thicker coating thickness or smaller particle size) or mat (thinner coating thickness or larger particle size), can be freely controlled by the thickness of the χ-alumina coating slurry of the present invention and the particle sizes of the χ-alumina nanoparticles. Furthermore, the coating layer formed by the χ-alumina coating slurry of the present invention has water resistance and high ink absorptivity, and the digital printout on the composite printing medium is water resistance without ink diffusion, instead of the conventional and complicated cold coating process for forming a water resistance layer, so as to save the coating process time and cost, as well as effective increase of printing quality and efficiency.

According to the preferred embodiments of the present invention, the aforementioned χ-alumina dispersion and coating slurry using the same of the present invention, which advantageously include flaked porous χ-alumina nanoparticles having low-cost and high specific surface area for making the coating slurry so as to form composite printing medium, thereby saving the coating process time and cost. Moreover, the resulted coating layer of composite printing medium has water resistance and high ink absorptivity, and the digital printout on the composite printing medium is water resistance without ink diffusion. Furthermore, the glossy or mat surface of the coating layer on the digital printing substrate can be formed by various thicknesses of the χ-alumina coating slurry of the present invention and various particle sizes of the χ-alumina nanoparticles. Therefore, printing quality and efficiency can be effectively improved, and the problems of the conventional silica-based coating layer with disadvantages, for example, high technical cost, conventionally complicated cold coating process for forming a water resistance layer, long coating process time, poor printing quality and so on, can be effectively solved.

As is understood by a person skilled in the art, the foregoing preferred embodiments of the present invention are illustrated of the present invention rather than limiting of the present invention. It is intended to cover various modifications and similar arrangements included within the spirit and scope of the appended claims. Therefore, the scope of which should be accorded to the broadest interpretation so as to encompass all such modifications and similar structure.

What is claimed is:

1. A composite printing medium for digital printing, comprising:
    a substrate having a surface; and
    a coating layer, wherein the coating layer is formed by evenly coating a coating slurry on the surface of the substrate and drying, and the coating slurry comprises:
        χ-alumina dispersion, wherein the χ-alumina dispersion comprises flaked porous χ-alumina nanoparticles evenly dispersing in water or acidic solution without gamma (γ)-alumina, and the flaked porous χ-alumina nanoparticles are formed by subjecting gibbsite to thermal treating, physical wet-milling and pH adjusting processes, and the flaked porous χ-alumina nanoparticles have a specific surface area of 100 $m^2/g$ to 220 $m^2/g$, an average thickness of 10 nm to 200 nm, an average cross-sectional diameter of 20 nm to 1000 nm and pore size over a surface of the flaked porous χ-alumina nanoparticles of 1 nm to 10 nm; and
        an adhesive added into the coating slurry in an amount of 8 wt. % to 20 wt. %, wherein the adhesive is selected from the group consisted of poly(vinyl alcohol) (PVA), casein, rosin glue and paraffin glue;
    wherein the coating slurry without dyes and pigments has a solid content of 20 wt. % to 40 wt. %, a pH value of 2 to 6, and the coating layer formed by the coating slurry has water resistance and an ink absorptivity of 1.5 $mg/cm^2$ to 1.8 $mg/cm^2$.

2. The composite printing medium for digital printing according to claim 1, wherein the surface of the substrate includes a material of paper, polymer, metal, ceramics, glass or textile.

3. The composite printing medium for digital printing according to claim 1, wherein the gibbsite is subjected to the thermal treating process under 500° C. to 700° C. for 50 minutes to 90 minutes.

4. The composite printing medium for digital printing according to claim 1, wherein the gibbsite is subjected to the thermal treating process under 600° C. for 70 minutes to 90 minutes.

5. The composite printing medium for digital printing according to claim 1, wherein the χ-alumina is subjected to the physical wet-milling process in the water or acidic solution of a pH value of 4 to 5.5 for 80 minutes to 160 minutes.

6. The composite printing medium for digital printing according to claim 5, wherein the acidic solution is a solution of nitric acid, sulfuric acid, phosphoric acid, hydrochloric acid, formic acid, acetic acid, propionic acid, oxalic acid or malonic acid.

7. The composite printing medium for digital printing according to claim 1, wherein the drying process is performed under 100° C. to 120° C. for 2 minutes to 10 minutes.

8. A method of making composite printing medium for digital printing, comprising:
    providing a coating slurry, wherein the coating slurry comprises:
        χ-alumina dispersion, wherein the χ-alumina dispersion comprises flaked porous χ-alumina nanoparticles evenly dispersing in water or acidic solution without gamma (γ)-alumina, and the flaked porous χ-alumina nanoparticles are formed by subjecting gibbsite to thermal treating, physical wet-milling and pH adjusting processes, and the flaked porous χ-alumina nanoparticles have a specific surface area of 100 $m^2/g$ to 220 $m^2/g$, an average thickness of 10 nm to 200 nm, an average cross-sectional diameter of 20 nm to 1000 nm and pore size over a surface of the flaked porous χ-alumina nanoparticles of 1 nm to 10 nm, and the χ-alumina dispersion has a solid content of 20 wt. % to 40 wt. % and a pH value of 2 to 6; and
        an adhesive added into the coating slurry in an amount of 8 wt. % to 20 wt. %, wherein the adhesive is selected from the group consisted of poly(vinyl alcohol) (PVA), casein, rosin glue and paraffin glue;
    wherein the coating slurry without dyes and pigments has a solid content of 20 wt. % to 40 wt. %, a pH value of 2 to 6, and the coating layer formed by the coating slurry has water resistance and an ink absorptivity of 1.5 $mg/cm^2$ to 1.8 $mg/cm^2$;
    coating the coating slurry onto a surface of a substrate; and
    performing a drying process to subjecting the coating slurry to form a coating layer on the surface of the substrate,
    wherein the coating layer has water resistance and an ink absorptivity of 1.5 $mg/cm^2$ to 1.8 $mg/cm^2$.

9. The method of making composite printing medium for digital printing according to claim 8, wherein the gibbsite is subjected to the thermal treating process under 600° C. for 70 minutes to 90 minutes.

10. The method of making composite printing medium for digital printing according to claim 8, the coating slurry on the surface is coated in a thickness of 100 μm to 300 μm.

* * * * *